(12) United States Patent
Tuunanen

(10) Patent No.: US 7,039,173 B2
(45) Date of Patent: May 2, 2006

(54) MANAGEMENT OF PERFORMANCE OF INTELLIGENT NETWORK SERVICES

(75) Inventor: Heikki Tuunanen, Espoo (FI)

(73) Assignee: Nokia Corporation, Espoo (FI)

( * ) Notice: Subject to any disclaimer, the term of this patent is extended or adjusted under 35 U.S.C. 154(b) by 652 days.

(21) Appl. No.: 10/038,646

(22) Filed: Jan. 8, 2002

(65) Prior Publication Data

US 2002/0059416 A1 May 16, 2002

Related U.S. Application Data

(63) Continuation of application No. PCT/FI00/00629, filed on Jul. 7, 2000.

(30) Foreign Application Priority Data

Jul. 9, 1999 (FI) ....................................... 991586

(51) Int. Cl.
 *H04M 7/00* (2006.01)
 *H04M 3/42* (2006.01)
(52) U.S. Cl. .................... 379/221.12; 379/221.09; 379/211.01
(58) Field of Classification Search ........... 379/112.04, 379/201.01, 207.02, 221.09, 221.12
 See application file for complete search history.

(56) References Cited

U.S. PATENT DOCUMENTS 5,825,860 A * 10/1998 Moharram ............. 379/112.01
6,363,144 B1 * 3/2002 Becher et al. ......... 379/211.01
6,545,987 B1 * 4/2003 Becher ....................... 370/328

FOREIGN PATENT DOCUMENTS

| WO | WO 97/07637 | 2/1997 |
| WO | WO 98/04090 | 1/1998 |
| WO | WO 98/19468 | 5/1998 |
| WO | WO 98/46030 | 10/1998 |
| WO | WO 98/48574 | 10/1998 |
| WO | WO 99/22528 | 5/1999 |

* cited by examiner

*Primary Examiner*—Ahmad F. Matar
*Assistant Examiner*—Hector Agdeppa
(74) *Attorney, Agent, or Firm*—Pillsbury Winthrop Shaw Pittman LLP

(57) ABSTRACT

A method of managing includes the performance of intelligent network services and an intelligent network, which includes a number of service control points and at least one service switching point, which includes triggering data of one or more intelligent network services, which include the address data of the service control point to which the intelligent network service request made to start the intelligent network service in question is sent, the intelligent network being arranged to control the performance of intelligent network services requested by the at least one service switching point in the control points by changing, if necessary, the address data of the control point in which the intelligent network service is to be performed into the triggering data of one or more intelligent network services included in the service switching point.

21 Claims, 2 Drawing Sheets

MANAGEMENT OF PERFORMANCE OF INTELLIGENT NETWORK SERVICES

This is a continuation of PCT application No. PCT/FI00/00629 filed Jul. 7, 2000.

BACKGROUND OF THE INVENTION

The invention relates to intelligent networks and particularly to management of the performance of intelligent network services.

In telecommunications networks intelligence is associated with the ability of accessing stored information, processing it and making decisions on the basis of it. Existing telecommunications networks, such as public switched telephone networks PSTN, are also intelligent to some extent because they are able to process stored information upon call routing, for instance. A typical 'intelligent' function in the existing telecommunications networks is conditional call forwarding, in which the call situation has to be analysed and the call forwarded according to the stored service profile of call forwarding. Such intelligent functions have, however, been an inseparable part of the basic network, in which case altering or adding of functions has required updating of the software in each switching centre of the network, for example.

Intelligent network of this kind is exemplified in the ITU-T (the International Telecommunications Union) recommendations of Q-1200 series. The invention and its background art will be described using the CorelNAP terminology of the standard ETS 300 374-1, but the invention can also be applied in intelligent networks implemented in accordance with other intelligent network standards.

An intelligent network IN means a network architecture which is connected to the basic network (e.g. fixed network or mobile communications network) and enables faster, easier and more flexible implementation and control of services. This is achieved by transferring the service control from the switching centre into a separate functional unit of the intelligent network. Thus the services will be independent of the function of the basic network and it is not necessary to alter the structure and the software of the basic network as services are altered or added. In the intelligent network there may be several service providers in addition to the actual network operator.

Standardization of intelligent networks has advanced rapidly during the past years. These standards define a certain functional and hierarchical model for an intelligent network. In this model the call control has been transferred from the switching centre of the basic network into a service control function (SCF) or service control point (SCP) in the intelligent network. The service control function includes all service logic and service-related controlling (e.g. the necessary database and service logic programs (SLP), i.e. computer programs that implement the logical structure of a certain service, i.e. service logic). The service control function may be a mere logic function which can be considered uniform in view of the service control point SSP. Its internal implementation may vary; it may be internally decentralized and the related service logic may be decentralized into different network nodes. The service data may also be decentralized into different network nodes than the service logic. For example, the service control function or point (SCF/SCP) may be internally decentralized so that it provides only an open interface (e.g. COBRA, Common Object Request Broker Architecture) to an external server offered by an external service provider. In that case the SCP and the external server form together the service control function. Intelligent network services are developed, tested and deleted using a specific device called the service creation environment (SCEP). A service management function (SMF) is used for managing the data related to the users and the network in a database, including service-specific data and service programs. A service switching point (SSC) is typically a switching centre, e.g. a switching centre of the basic network, which performs a service switching function (SSF), i.e. identification of the network service and initiation of cooperation with the service control point SCP, but the SSP may also be another kind of network element, e.g. a node (such as H.323 Gatekeeper) which is responsible for establishing a connection in the VoIP protocol (Voice IP). When a call involving an intelligent network service is set up, the service switching point SSP takes care of the connection arrangements. An intelligent network service is produced as follows: an intelligent network service is started when detection points (DP) related to the services and defined by the call state model (BCSM) describing the state of the call control are met, in which case the service switching point SSP asks for instructions from the service control point SCP. In other words, the SSP hands over the control to the SCP and starts to wait for operations from the SCP. In connection with the triggering of an intelligent network service, a service logic program SLP is started in the service control point SCP, the function of the SLP being defined by the instructions the SCP sends to the SSP in each call phase. The SSP interprets the instructions it has received and initiates the call control functions requested in them. Triggering of an intelligent network service means that the intelligent network function is initiated by an impulse generated when a certain identification condition is fulfilled.

The above describes the structure of existing intelligent networks. In this application the intelligent network generally refers to a solution in which a node transmitting a call, a session or packet data contacts the service control function, which gives the node in question instructions affecting the transmission of the call, session or packet data. The communication from the node in question to the service control function is based on the service triggering data possessed by the node. The characteristic features of an intelligent network include triggerings, state models and a protocol giving controls or an API interface between the control function and the network switching node. The call, session or transmission of packet data can be described with a state model which is visible to the control function and consists of phases and detection points which are related to the phases and in which processing can be interrupted to wait for instructions from the control function. Controls and operations may also be methods to be applied to call objects and related event notifications.

An intelligent network may comprise several service control points SCP. All different service control points may provide the same intelligent network services or they may be specialized in certain services. WO 9707637 discloses an intelligent network which comprises several specialized service control points, one of which functions as the router so that the service switching point SSP always first contacts the routing service control point and transmits the service request to a secondary service control point for providing the intelligent network service, or alternatively performs the service itself.

The problem associated with the arrangement described above is that re-routing from the routing service control point causes a delay in the performance of the intelligent network service.

BRIEF DESCRIPTION OF THE INVENTION

The object of the invention is to provide a method and an apparatus implementing the method to eliminate the above-mentioned problems. The objects of the invention are achieved with a method and a system which are characterized by what is disclosed in independent claims 1, 10, 18 and 20. The preferred embodiments of the invention are described in the dependent claims.

The invention is based on inserting the address data of the control point where the intelligent network service concerned is to be performed into the triggering data of one or more intelligent network services included in the service switching point, in which case the service switching point sends, when starting the intelligent network service concerned next time, the intelligent network service request directly to the control point mentioned in the triggering data.

An advantage of the method and system of the invention is that performance of intelligent network services can be divided between several service control points e.g. according to the load situation without always having to route the intelligent network service requests sent by the service switching point via a certain master control point. Since the invention allows to eliminate routing in several cases, the delay caused by routing can also be avoided. The invention also enables controlling of intelligent network services in advance and at the same time load management because the address data included in the triggering data of the intelligent network services in the service switching points can be changed before the service in question is used. In that case a desired number of intelligent network service requests can be directed so that they are directly transmitted to certain less loaded service control points, for example.

BRIEF DESCRIPTION OF THE DRAWINGS

The invention will be described in greater detail by means of preferred embodiments, with reference to the accompanying drawings, in which.

DETAILED DESCRIPTION OF THE INVENTION

Figure 1:
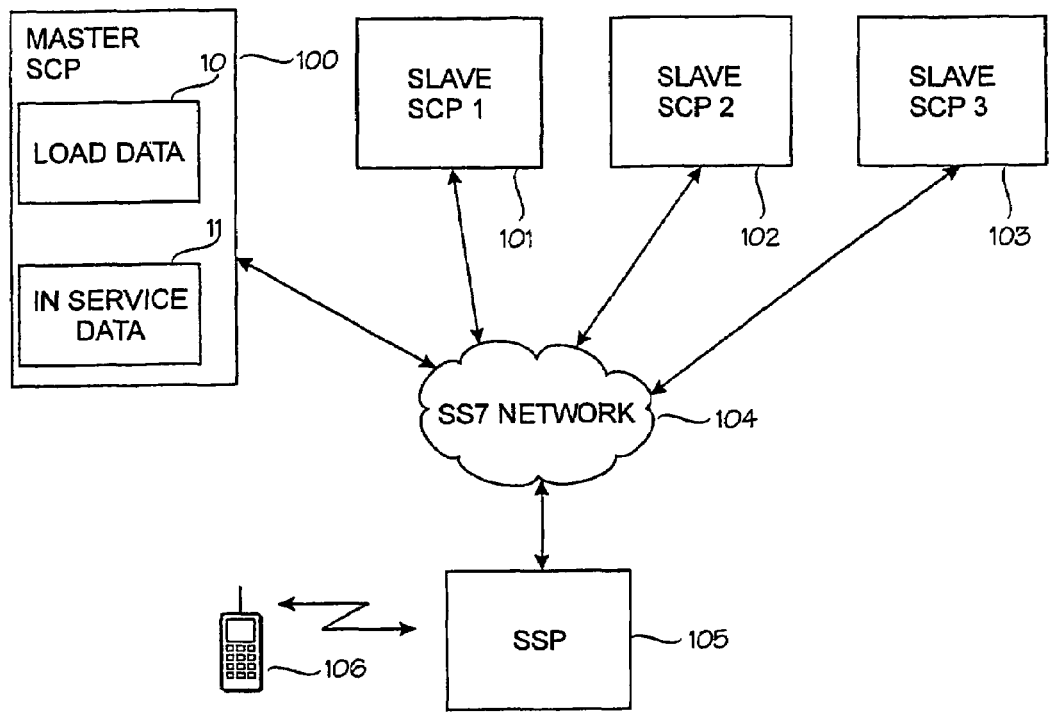
FIG. 1 is a block diagram illustrating an intelligent network of the invention according to one embodiment.

FIG. 1 is a block diagram illustrating an intelligent network according to the invention. It should be noted that the figure shows only the elements that are necessary for understanding the invention. The structure of the intelligent network may also differ from what has been shown without affecting the basic idea of the invention. Network elements 105 that include the service switching function (SSF) and the call control function (CCF) are called service switching points (SSP). The call control function CCF (not shown in the FIGURE) is not a function related to the intelligent network, but a standard function in switching centres including high-level call processing functions of the switching centres, such as set-up and release of transmission connections. The service switching function SSF (not shown in the figure) is an interface between the call control function CCF and the service control function SCF (not shown in the figure). The SSF interprets the requests sent by the SCF and forwards them to the CCF, which initiates the call control functions required in them. Correspondingly, the call control function CCF uses the SSF to ask for instruction from the SCF. The service switching point SSP 105 illustrated in FIG. 1 is e.g. a switching centre, which in addition to the CCF and SSF includes a function (CCAF, Call Control Agent Function) which provides network access for users 106. Since the SSP 105 comprises the CCAF, it may be either a local switching centre in a fixed network or a mobile services switching centre controlling the base station sub-system BSS of a mobile communication network PLMN. The user's 106 terminal can thus be a telephone, the switching centre of a company with telephones, or a mobile station communicating over the air interface, including the equipment supporting it. Network elements 100 to 103, which include the service control function (SCF), are called the service control point (SCP). The service control function is a centralized authority in the intelligent network, comprising e.g. the execution environment for service logic programs.

There may be several service switching points SSP 105 connected to one service control point SCP 100 to 103 and, correspondingly, one service control point SSP 105 may be connected to several service control points SCP 100 to 103. To improve the reliability of the network and to distribute the load, more than one SCP 100 to 103 may comprise the same service logic program and data or access to the same data.

In the system of FIG. 1 the elements are connected to each other by means of a signalling network SS7 (SS7, Signalling System Number 7 is a prior art signalling system described in the CCITT (now ITU-T) recommendations) 104. It is also possible to use other networks, such as the ISDN. In their mutual communication the switching point 105 and the control point 100 to 103 use e.g. an INAP protocol (Intelligent Network Application Protocol, which is described e.g. in the ETSI (European Telecommunications Standards Institute) standard ETSI IN CS1 INAP part 1: Protocol Specification, prETS 300 374-1). In the SS7 protocol stack the INAP layer is the uppermost layer below which there is a TCAP layer (Transaction Capabilities Application Part), SCCP layer (Signalling Connection Control Point) and MTP layer (Message Transfer Part).

When a call involving an intelligent network service is set up, the service switching point SSP 105 takes care of the connection arrangements. The intelligent network service is implemented as follows: the intelligent network service is started as the detection points (DP) related to the services are met, in which case the service switching point 105 asks for instructions from the service control point SCP 100 to 103, i.e. sends an intelligent network service request to the control point. In other words, the SSP 105 hands over the control to the SCP and starts to wait for operations from the SCP. The service switching point SSP includes triggering data of the intelligent network service, which further comprise the address data of the service control point SCP to which the intelligent network service request is sent when the intelligent network service is triggered. In connection with the triggering of an intelligent network service, a service logic program SLP is started in the service control point SCP, the function of the program defining the instructions that the SCP sends to the SSP in each call phase. The SSP interprets the instructions it has received and initiates the call control functions required in them. Thus the triggering of the intelligent network service means that the intelligent network function is initiated by an impulse generated when a certain identification condition is fulfilled, i.e. the services of the intelligent network are triggered in the detection points defined by a call state model (BCSM) describing the function of call control, the points being set as trigger detection points TDP.

The invention is based on a mechanism by means of which the performance of intelligent network services can be dynamically forwarded from the service control switching point SSP 105 to different service control points 100 to 103 when a number of service control points SCP are reserved for the performance of intelligent network services, in which case at least one of the service control points functions as the master control point (master SCP) 100 and, in addition, at least one of the points is a slave control point (slave SCP) 101 to 103. The control points 100 to 103 may also exchange tasks e.g. so that one of the slave control points becomes a master control point and the control point that functioned as the master control point becomes a slave control point. Furthermore, there may be more than one master control point 100. In that case the master control points preferably agree on the distribution of tasks between themselves. According to the invention, the performance of intelligent network services is to be decentralized already in the service switching point SSP by updating the addresses of the service control point included in the triggering data of intelligent network services e.g. according to the load situation.

According to a preferred embodiment of the invention, the service switching point is configured so that an intelligent network service request is forwarded to the master control point 100 when the intelligent network service is started for the first time. As a result of this, the master control point 100 selects one of the slave control points 101 to 103 and routes the service request to the selected slave control point 101 to 103. The master control point 100 may also perform the service itself, in which case routing is unnecessary. Having received the service request, the slave control point 101 to 103 answers to the service switching point 105 that requested the service. Having received the answer, the service switching point 105 changes the address of the slave control point 101 to 103 that answered to it into the triggering data of the intelligent network service, and thus next time the intelligent network service request is forwarded directly to the selected slave control point 101 to 103. The address can also be changed so that the switching point 105 always changes the address of the control point from which the answer to the service request is received into the triggering data of the intelligent network service. Alternatively, the address can also be changed in such a manner that the control point 100 to 103 requests the switching point 105 to change the address included in the triggering data of the intelligent network service at the same time as it answers to the service request.

Selection of the slave control point 101 to 103 in the master control point 100 is performed on the basis of the load situation, for example. The master control point 100 preferably knows the load situation of all service control points 100 to 103 or at least that of some control points since it maintains a database 10 on the load data, and can thus distribute the tasks of performing intelligent network services evenly to different slave control points. Various limit values may also be set for the different control points e.g. with respect to the load, which may vary and which the master control point takes into account when selecting the slave control point. The master control point 100 finds out the load situation of the slave control points 101 to 103 e.g. by sending control messages which require an answer to the slave control points 101 to 103 and by means of notifications of the load situation sent by the slave control points 101 to 103. Service control points 101 to 103 may also be specialized in performing different intelligent network services, in which case the master control point 100 preferably has information on the services offered by the different service control points 100 to 103 since it maintains a database 11 and can select the slave control point 101 to 103 on the basis of the type of the requested intelligent network service, too. In addition, the master control point may use the identity of the subscriber who asked for the service as a criterion in the selection of the slave control point. Other criteria than the above-mentioned ones can also be used in the selection of the control point to be used without affecting the basic idea of the invention.

Figure 4:
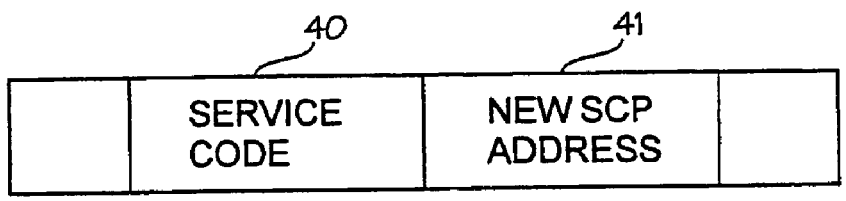
FIG. 4 illustrates an operation used for changing the service control point according to one embodiment.

If one of the slave control points 101 to 103 is overloaded, it may ask for re-routing of intelligent network services from the master control point 100. The slave control point 101 to 103 can request re-routing at any time: either after the service switching point 105 has made a service request or spontaneously. When the slave control point 101 to 103 asks for re-routing of the service request from the switching point 105 after it has received the service request, the master control point 100 forwards the service request to another slave control point which it has selected and which then answers to the service switching point 105 that requested the service. Having received an answer, the service switching point 105 replaces the address data with the address of the slave control point that answered in the triggering data of the service. If the master control point 100 notes that a slave control point 101 to 103 is overloaded, the master control point may send an order to all service switching points 105 connected to the network (or only to those points that use the services of the loaded slave control point) that the address of the loaded slave control point should be replaced with the address of another slave control point given by the master control point 100 in all triggering data or in some of them of the intelligent network services included in the service switching point 105. The addresses can be replaced e.g. using an operation between the SSP and the SCP particularly reserved for this purpose. FIG. 4 illustrates an example of a mode of such an operation. The operation preferably comprises at least the code of the intelligent network service 40 the triggering data of which are to be changed and the address 41 of the control point which is to be inserted into the triggering data of the intelligent network service and which is to be used for performing the intelligent network service. The mode of the operation to be used may differ from what has been described without affecting the basic idea of the invention. The master control point 100 can also re-route the services of one of the slave control points 101 to 103 to another slave control point for reasons other than the load situation, e.g. because of the service of the slave control point 101 to 103. The services can be routed to another slave control point 101 to 103 (or performed in the master control point 100) e.g. temporarily and routed back to the original slave control point after a predetermined period.

Figure 2:
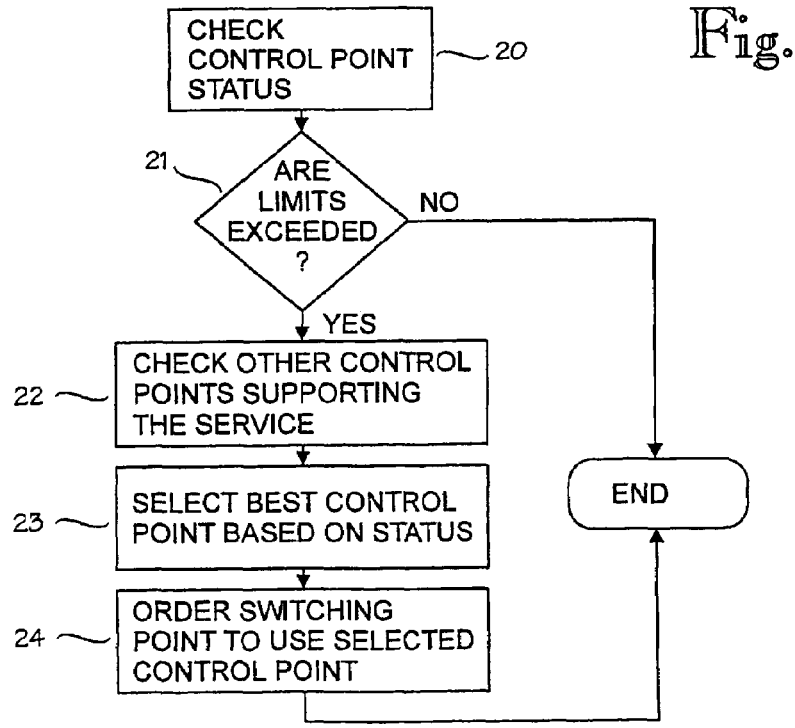
FIG. 2 is a flow chart illustrating the function of a service control point of the invention according to one embodiment.

FIG. 2 is a flow chart illustrating the function of the master control point 100 according to an embodiment of the invention. Having received an intelligent network service request from the switching point 105, the master control point checks the status of the control point 101 to 103 in step 20. In step 21 the master control point compares e.g. the load values of the control point to a pre-set limit value. The limit value may be e.g. 95% of the maximum load. If the limit value is exceeded, the status of other control points that can perform the requested service is checked in step 22. In step 23 the master control point selects the best control point on the basis of the status, e.g. a point the load of which is the lowest and under a pre-set limit, e.g. 75% of the maximum load. In step 24 the master control point 100 orders the switching point 105 to use the selected control point. The limits may also be multi-level limits, i.e. if the load of a control point is 90% of the maximum level, part of the load is transferred from this control point to another control point that can perform the same service, provided that a control point the load of which is below 50% of the maximum load is found.

Figure 3:
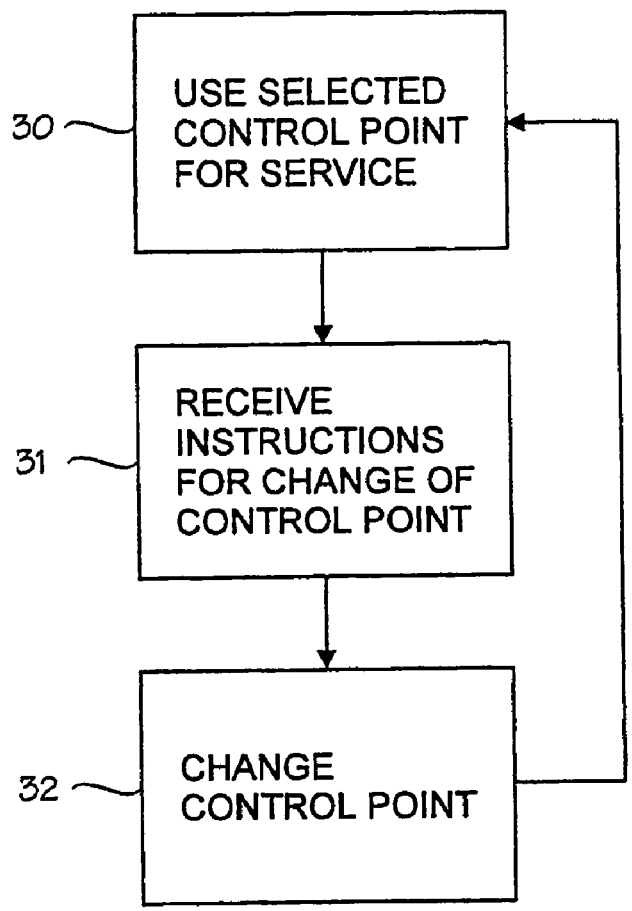
FIG. 3 is a flow chart illustrating the function of a service switching point of the invention according to one embodiment.

FIG. 3 is a flow chart illustrating the function of the service switching point 105 according to an embodiment of the invention. In step 30 the switching point 105 uses the control point 100 to 103 mentioned in its triggering data for a certain intelligent network service. In step 31 the switching point 105 receives a request for changing the control point from the control point 100 to 103. In step 32 the switching point 105 changes the control point 100 to 103 used for the intelligent network service according to the instructions it has received.

Re-routing of the slave control point 101 to 103 responsible for performing the intelligent network service can also be activated from the service switching point 105. If the slave control point 101 to 103 defined as the primary control point in the triggering data of the intelligent network service does not answer to the service request within a certain period, the service switching point 105 retrieves a secondary service control point from the triggering data which is the master control point 100. In that case the intelligent network service request is transmitted to the master control point 100, which selects a suitable slave control point 101 to 103 (or performs the service itself) in the same way as when the intelligent network service is started for the first time, which was described above. Use of the primary or secondary address in the triggering data of the intelligent network service as was described above allows to improve the availability of critical services, for example.

If intelligent network services have to be transferred from one slave control point 101 to 103 to another when they are running, it is also necessary to transfer the state information of the running service logic program related to the intelligent network service to be transmitted from the original slave control point to the substitute slave control point, because mere change of the address information of the service control point in the triggering data of the intelligent network service does not change the service control point used until the service is started next time.

Thanks to the invention, it is also possible to prepare for the additional load caused by the increase of the intelligent network services. Since re-routing of intelligent network services to different service control points 100 to 103 in accordance with the load situation, for example, is dynamic, the capacity of the intelligent network services can be increased or decreased by increasing or decreasing the number of service control points connected to the intelligent network. Dynamic load distribution enables immediate utilization of additional capacity, for example. Furthermore, the invention allows to hide functions related to load management from the service switching points 105. Only the need to update the identification of the service control point to be used included in the triggering data of the intelligent network service is shown to the service switching point e.g. when the intelligent network service is started or when this is required by the master control point 100.

It will be obvious to a person skilled in the art that as the technology advances, the inventive concept can be implemented in various ways. The invention and its embodiments are thus not limited to the above examples but may vary within the scope of the claims.

What is claimed is:

1. A method of managing the performance of intelligent network services in an intelligent network, which comprises a number of service control points and at least one service switching point, which comprises triggering data of one or more intelligent network services, which include the address data of the service control point to which the intelligent network service request made to start the intelligent network service in question is sent, characterized by controlling the performance of intelligent network services requested by said at least one service switching point in the control points by changing, if necessary, the address data of the control point in which the intelligent network service is to be performed into the triggering data of one or more intelligent network services included in the service switching point.

2. A method according to claim 1, characterized in that at least one of said service control points is a master control point in which the load data of one or more control points and/or data on the intelligent network services offered by one or more control points are maintained, the performance of intelligent network services being directed to the control points on the basis of said data maintained in the master control point.

3. A method according to claim 2, characterized by directing an intelligent network service made by a service switching point to the master control point when said intelligent network service is being started for the first time;

selecting in the master control point, a control point in which said intelligent network service is to be performed; and changing the address data of the selected control point into the triggering data of said intelligent network service in the service switching point.

4. A method according to any one of claims 1 to 3, characterized by replacing a certain control point used for one or more intelligent networks services by one or more service switching points with another control point if the control point concerned is overloaded.

5. A method according to any one of claims 1 to 4, characterized by replacing a certain control point used for one or more intelligent networks services by one or more service switching points with another control point for a predetermined period, if necessary, e.g. for the duration of the service of the control point in question.

6. A method according to any one of claims 2 to 5, characterized by directing an intelligent network service request made by a service switching point to the master control point if the control point to which the intelligent network service request was primarily sent does not answer to the request within a predetermined period, selecting in the master control point, a control point in which said intelligent network service is to be performed, and changing the address data of the selected control point into the triggering data of said intelligent network service in the service switching point.

7. A method according to any one of claims 1 to 6, characterized by transferring state data of a running intelligent network service from a previously used control point to a control point to which the performance of the intelligent network service is transferred.

8. A method according to any one of claims 1 to 7, characterized by connecting more control points to the intelligent network or disconnecting control points from the intelligent network according to the load situation.

9. A method according to any one of claims 2 to 8, characterized by transferring the functionality of the master control point from one control point to another.

10. An intelligent network which comprises a number of service control points (100 to 103) and at least one service switching point (105), which comprises triggering data of one or more intelligent network services, which include the address data of the service control point (100 to 103) to which the intelligent network service request made to start the intelligent network service in question is sent, characterized in that the intelligent network being arranged to control the performance of intelligent network services requested by said at least one service switching point (105) in the control points (100 to 103) by changing, if necessary, the address data of the control point (100 to 103) in which the intelligent network service is to be performed into the triggering data of one or more intelligent network services included in the service switching point (105).

11. An intelligent network according to claim 10, characterized in that at least one of said service control points (100 to 103) is a master control point (100) which is arranged to collect and maintain load data (10) of one or more control points (100 to 103) and/or maintain data (11) on the intelligent network services offered by one or more control points (100 to 103), and direct the performance of intelligent network services to the control points (100 to 103) on the basis of said data (10, 11) to be maintained.

12. An intelligent network according to claim 11, characterized in that the service switching point (105) is arranged to send an intelligent network service request to start an intelligent network service to the master control point (100) when said intelligent network service is started for the first time, the master control point (100) is arranged to select, in response to the intelligent network service request, a control point (100 to 103) in which said intelligent network service is to be performed and to transmit the intelligent network service request to the selected control point, the control point (100 to 103) is arranged to answer to the service switching point (105) that requested the intelligent network service in response to the intelligent network service request transmitted by the master control point (100), and the service switching point (105) is arranged to change the address data of the selected control point into the triggering data of said intelligent network service in response to the answer sent by the control point.

13. An intelligent network according to claim 11 or 12, characterized in that the master control point (100) is arranged to send a request to one or more service switching points (105) for replacing a certain control point (100 to 103) used by the service switching point for one or more intelligent network services with another control point in response to overloading of said control point or, if necessary, because of the service of said control point, for example.

14. An intelligent network according to any one of claims 11 to 13, characterized in that the service switching point (105) is arranged to send an intelligent network service request made to start an intelligent network service to the master control point (100) in response to the fact that the control point (100 to 103) to which the intelligent network service request was primarily sent does not answer to the request within a predetermined period, the master control point (100) is arranged to select, in response to the intelligent network service request, a control point (100 to 103) in which said intelligent network service is to be performed and to transmit the intelligent network service request to the selected control point, the control point (100 to 103) is arranged to answer to the service switching point (105) that requested the intelligent network service in response to the intelligent network service request transmitted by the master control point (100), and the service switching point (105) is arranged to change the address data of the selected control point into the triggering data of said intelligent network service in response to the answer sent by the control point.

15. An intelligent network according to any one of claims 10 to 14, characterized in that the intelligent network is arranged to transfer state data of a running intelligent network service from a previously used control point to a control point to which the performance of the intelligent network service is to be transferred.

16. An intelligent network according to any one of claims 10 to 15, characterized in that the intelligent network is arranged to increase or decrease the number of control points (100 to 103) according to the load situation.

17. An intelligent network according to any one of claims 11 to 16, characterized in that the functionality of the master control point (100) can be transferred from one control point (100 to 103) to another.

18. A service control point of an intelligent network, which comprises a number of service control points (100 to 103) and at least one service switching point (105), which comprises triggering data of one or more intelligent network services, which include the address data of the service control point (100 to 103) to which the intelligent network service request made to start the intelligent network service in question is sent, characterized in that the service control point (100) is arranged to collect and maintain load data of one or more control points (100 to 103) and/or maintain data on the intelligent network services offered by one or more control points (100 to 103) and direct the performance of intelligent network services to the control points (100 to 103) on the basis of said data (10, 11) to be maintained by changing the address data of the control point (100 to 103) in which said intelligent network service is to be performed into the triggering data of one or more intelligent network services included in the service switching point (105).

19. A service control point according to claim 18, characterized in that
the service control point (100) is arranged to send a request to one or more service switching points (105) for replacing a certain control point (100 to 103) used by the service switching point for one or more intelligent network services with another control point in response to overloading of said control point or, if necessary, because of a service of said control point, for example.

20. A service switching point of an intelligent network, which comprises a number of service control points (100 to 103) and at least one service switching point (105), which comprises triggering data of one or more intelligent network services, which include the address data of the service control point (100 to 103) to which the intelligent network service request made to start the intelligent network service in question is sent, characterized in that the service switching point (105) is arranged to
replace the control point (100 to 103) used for one or more intelligent network services with another control point in response to a request sent by a control point (100 to 103) by changing the address data of the control point (100 to 103) in which said intelligent network service is to be performed into the triggering data of the intelligent network service.

21. A service switching point according to claim 20, characterized in that the service switching point (105) is arranged to send the intelligent network service request made to start the intelligent network service to a predetermined control point (100 to 103) in response to the fact that the control point (100 to 103) to which the intelligent network service request was primarily sent does not answer to the request within a predetermined period.

* * * * *